3,535,515
**ULTRASONIC APPARATUS FOR
ELECTRON MICROSCOPE**
Vernon O. Jones and Bertwin Langenecker, China Lake,
Calif., assignors to the United States of America as
represented by the Secretary of the Navy
Filed June 14, 1967, Ser. No. 646,127
Int. Cl. H01j 37/20
U.S. Cl. 250—49.5                     7 Claims

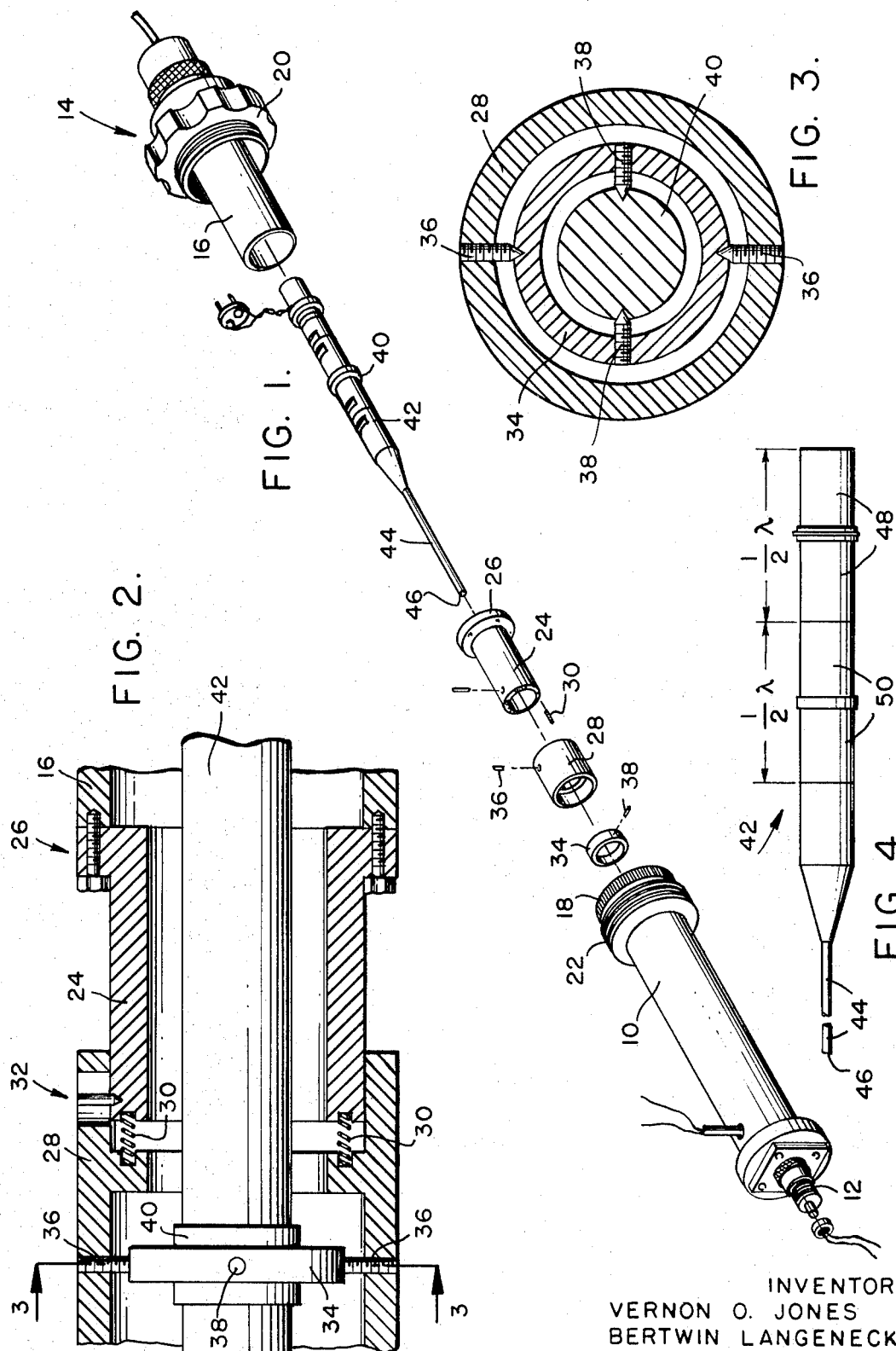

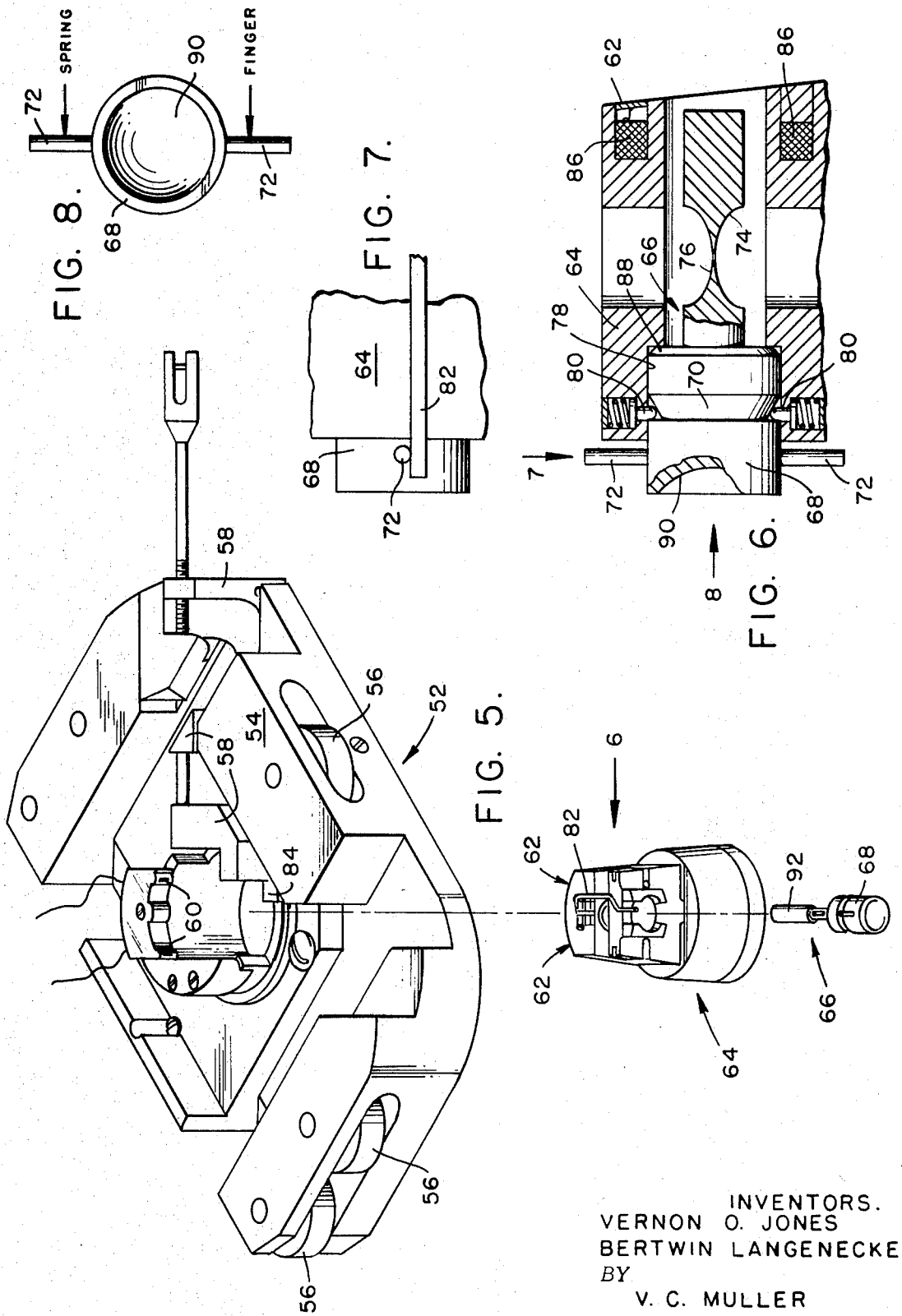

ABSTRACT OF THE DISCLOSURE

Specimen under observation is subjected to ultrasonic energy while in situ within the microscope.

The invention described herein may be manufactured and used by or for the Government of the United States of America for governmental purposes without the payment of any royalties thereon or therefor.

This invention relates to electron microscopes and more particularly to accessories which enable observation of the effects of applying ultrasonic energy to a specimen while in situ within the microscope.

It has been the practice in the prior art, when it was desired to observe effects of ultrasonic energy on solids, to subject a solid to the energy outside of the microscope and subsequently insert it in the microscope and observe the effects. This technique led to inconclusive observations due to distortions resulting from handling the delicate specimen and also precluded observations during the time the specimen was subjected to the energy.

One of the objects of this invention is to simultaneously observe a specimen in an electron microscope while being subjected to ultrasonic energy.

Another object is to provide a novel horn or probe which applies ultrasonic energy to a specimen under observation.

Another object is to provide a novel specimen cartridge for use with a microscope stage which is operatively associated with the probe.

Still further objects, advantages and salient features will become apparent from the description to follow, the appended claims, and the accompanying drawing, in which:

FIG. 1 is an exploded view of a microscope attachment for applying ultrasonic energy to a specimen;

FIG. 2 is an enlarged longitudinal section of a portion of FIG. 1 in assembled relationship;

FIG. 3 is a section taken on line 3—3, FIG. 2;

FIG. 4 is a side elevation of a portion of FIG. 1;

FIG. 5 is an exploded view of a microscope stage, cartridge and specimen holder;

FIG. 6 is an enlarged detail of the specimen holder as viewed in the direction of arrow 6, FIG. 5;

FIG. 7 is a detail as viewed in the direction of arrow 7, FIG. 6; and

FIG. 8 is a detail as viewed in the direction of arrow 8, FIG. 6.

Referring now to the drawing, and first to FIG. 1, tube 10 is vacuum sealingly connected at its left end to the microscope in any suitable manner, such as by a threaded adapter 12, the axis of the tube being perpendicular to the microscope axis and disposed exterior of the microscope.

The right end of the tube is closed by a member 14 having a tube 16 which slideably engages within a vacuum seal 18 and which may be moved linearly by a rotatable nut 20, carried by member 14, which engages threads 22 on tube 10. As best shown in FIG. 2, a tubular member 24 is secured to the inner end of tube 16 by a screw and flange connection 26. A gimbal ring support sleeve 28 telescopes over member 24 and is urged away from same by a plurality of angularly spaced springs 30, the sleeve being restrained against rotation relative to member 24 but having limited linear movement by a pin and slot connection 32. A gimbal ring 34 is disposed within sleeve 28 and is pivoted to it by a pair of diametrically opposed conical point screws 36. The gimbal ring carries a pair of like screws 38 disposed 90° to screws 36, the ends of which engage conical depressions in a circular flange 40 disposed on horn or probe 42. The probe is thus universally mounted for movement about perpendicular axes passing through flange 40 and also movable linearly by rotating nut 20. The universal movement is limited by the size of the aperture in tube 10 through which reduced portion 44 passes so that the spherical end or tip 46 will always engage a spherical socket on the specimen which will subsequently be described. Briefly, however, at this point, it will be understood that the spherical tip must be backed away from the specimen before the specimen can be removed from the microscope and that the spherical tip may be reengaged with a specimen by rotating nut 20 which applies a spring loading on same by springs 30 and allows the tip to follow the specimen in its various movements to be subsequently described.

The horn is constructed from a commercial $\frac{1}{2}\lambda$ length transducer 48 with crystals at its center, a $\frac{1}{2}\lambda$ length portion 50 with the gimbal axis at its center, probe 44 being a variable length, determined by experiment, to best transmit acoustic energy to the specimen.

Referring now to FIG. 5, the microscope stage 52 is of generally conventional design comprising a plate-like member 54 which carries suitable rollers 56 and spring and screw adjustments (not shown) which permit it to be moved in two perpendicular directions in a plane perpendicular to the microscope axis by knobs or the like disposed outside of the microscope. The principal alterations to the conventional stage comprises a specimen tilting device 58 and electrical contacts 60 which engage electrical contacts 62 on cartridge 64 which supports specimen 66.

Cartridge 64 comprises a frusto-conical body having flattened sides which permit it to accurately seat in a like socket in the stage, it being understood that the cartridge may be removed from the microscope through a conventional air lock device which prevents loss of vacuum within the microscope. The cartridge differs from conventional cartridges, however, principally by the addition of certain apparatus for permitting the specimen to be rotated about its longitudinal axis, the manner in which the specimen is held in the cartridge and the addition of a magnetostrictive coil which picks up a signal from the specimen while it is being subjected to ultrasonic energy.

The specimen is formed with a cylindrical portion 68 having a circular groove 70, a cross pin 72, and a reduced portion 74 having a diaphragm 76 etched to electron transparency. As best illustrated in FIG. 6, the specimen is supported in the cartridge in a bore 78 and retained therein in a predetermined position by a pair of diametrically opposed spring urged detents 80. A flat spring 82 engages one end of cross pin 72 for urging it in one direction of rotation and a movable finger 84 on tilting device 58, controlled from outside the microscope, engages the other end of the cross pin. A magnetostrictive coil 86 is carried by the cartridge which surrounds the specimen and suitable leads connect with contacts 62 which engage contacts 60 on the stage. As will be apparent, when the cartridge is in position in the stage the magnetostrictive coil is electrically connected through suitable leads extending to instrumentation outside of the microscope.

In the operation of the apparatus, specimen 66 is prepared in conventional manner and inserted in the cartridge, detents 80 urging it to a predetermined position against shoulder 88. The cartridge is then passed through a vacuum seal in the microscope and positioned in the stage. Nut 14 is then rotated, moving spherical tip 46 on probe 44 into engagement with spherical depression 90 on one end of the specimen. The stage may then be moved in conventional manner in perpendicular directions in the plane of the stage to place diaphragm 76 in the desired position relative to the electron beam. In addition, however, the specimen may be rotated about its longitudinal axis to place the plane of diaphragm 76 at a non-perpendicular angle to the axis of the electron beam. Ultrasonic energy is then applied to the probe, the tip of which transmits it to the specimen which may then be observed under the effects of such energy in situ in the microscope. Suitable instrumentation connected to magnetostrictive coil 86 records the signal generated by the specimen which is a measure of the actual energy imparted to it during the observation.

In the event the specimen is of non-magnetic material, its outer end may be provided with a magnetic portion 92, as illustrated in FIG. 5.

Obviously many modifications and variations of the present invention are possible in the light of the above teachings. It is therefore to be understood that within the scope of the appended claims the invention may be practiced otherwise than as specifically described.

What is claimed is:

1. Apparatus for subjecting a specimen to ultrasonic energy while under observation in the stage of an electron microscope, comprising:
    (a) specimen holding cartridge supported by the stage adapted to be removed from the stage and from the inside of the microscope,
    (b) a probe extending through a wall of the microscope having a tip abutting an end of the specimen, and
    (c) means for applying ultrasonic energy to the probe, whereby the specimen is subjected to such energy while under observation.

2. Apparatus in accordance with claim 1, including means for rotating the specimen about an axis perpendicular to the axis of the electron beam of the microscope.

3. Apparatus in accordance with claim 2 wherein the means for rotating the specimen comprises a cross-pin extending from the specimen, a spring engagable with one end of the pin, and a movable finger engagable with the other end of the pin adapted to rotate the specimen against the urge of the spring.

4. Apparatus in accordance with claim 1 wherein said cartridge is provided with a magnetostrictive coil surrounding a portion of the specimen for detecting the actual energy to which the specimen is subjected.

5. Apparatus in accordance with claim 4 including electrical contacts carried by the cartridge and connected to the coil, and electrical contacts carried by the stage engagable with the cartridge contacts, all contacts adapted to be separated when the cartridge is removed from the stage.

6. Apparatus in accordance with claim 1 wherein the specimen is provided with a spherical groove at one end and the probe is provided with a spherical tip abutting the groove, and intermediate portion of the probe being supported by a spring urged gimbal, and means for limiting the universal movement of the probe tip, whereby it may abut the spherical groove in all positions of adjustment of the specimen within the microscope.

7. Apparatus in accordance with claim 1 wherein the specimen holding cartridge is provided with detents for urging the specimen to a predetermined position.

References Cited

UNITED STATES PATENTS

| | | | |
|---|---|---|---|
| 2,464,382 | 3/1949 | Dornfeld | 250—49.5 |
| 2,476,150 | 7/1949 | Koppius | 250—51.5 |
| 2,496,051 | 1/1950 | Hillier | 250—49.5 |
| 2,510,349 | 6/1950 | Reisner | 250—49.5 |

WILLIAM F. LINDQUIST, Primary Examiner